US012790184B2

(12) United States Patent
Monchiero et al.

(10) Patent No.: US 12,790,184 B2
(45) Date of Patent: Nov. 10, 2026

(54) TOWING WINCH AND FOREST MACHINE PROVIDED WITH SAID WINCH

(71) Applicant: MONCHIERO S.r.l., Bra (IT)

(72) Inventors: Massimo Monchiero, Bra (IT); Giancarlo Rinero, Bra (IT)

(73) Assignee: MONCHIERO S.r.l. (IT)

( * ) Notice: Subject to any disclaimer, the term of this patent is extended or adjusted under 35 U.S.C. 154(b) by 363 days.

(21) Appl. No.: 18/570,908

(22) PCT Filed: Jun. 17, 2022

(86) PCT No.: PCT/IB2022/055635

§ 371 (c)(1),
(2) Date: Dec. 15, 2023

(87) PCT Pub. No.: WO2022/264100

PCT Pub. Date: Dec. 22, 2022

(65) Prior Publication Data

US 2024/0317549 A1 Sep. 26, 2024

(30) Foreign Application Priority Data

Jun. 18, 2021 (IT) ........................ 102021000016052

(51) Int. Cl.
*B66D 1/12* (2006.01)
*A01G 23/00* (2006.01)
*B66D 1/48* (2006.01)

(52) U.S. Cl.
CPC ............. *B66D 1/12* (2013.01); *A01G 23/006* (2013.01); *B66D 1/485* (2013.01)

(58) Field of Classification Search
CPC ........................................................ B66D 1/12
See application file for complete search history.

(56) References Cited

U.S. PATENT DOCUMENTS

2019/0077642 A1 3/2019 Huang
2020/0189890 A1* 6/2020 Kieser .................. E02F 9/2016
2020/0190769 A1* 6/2020 Hand .................... E02F 9/2221

FOREIGN PATENT DOCUMENTS

CN 113423659 A * 9/2021 ............... B66D 3/26
DE 202012102970 U1 9/2012
(Continued)

OTHER PUBLICATIONS

Georg, Forestry winch (with English translation), 2013, Koller GmbH, p. 5 (Year: 2013).*
(Continued)

*Primary Examiner* — Suresh Suryawanshi
(74) *Attorney, Agent, or Firm* — The Belles Group, P.C.

(57) ABSTRACT

A forest machine has a carriage driven by a thermal engine and a towing/holding winch carried by the carriage and having a towing drum of the cable and a rotation electric motor of the towing drum commanded and controlled by an electric drive and control circuit having an accumulator pack, a detection block for detecting the electric energy absorbed by the electric motor during one or more towing steps of the load hooked to the cable and the electric energy returned in one or more holding steps of the same load, a comparator block for calculating the difference between the absorbed electric energy and the returned electric energy and an electric energy generator driven directly or indirectly by the thermal engine for sending the calculated electric energy difference to the accumulator pack; the electric drive and control circuit further having a control assembly of the tension of the cable.

12 Claims, 6 Drawing Sheets

(56) References Cited

FOREIGN PATENT DOCUMENTS

| | | | | | |
|---|---|---|---|---|---|
| DE | 102011122121 | B3 | | 6/2013 | |
| DE | 102014009921 | A1 | * | 1/2016 | ............. F16H 61/47 |
| EP | 3741205 | A1 | * | 11/2020 | ........... A01G 23/006 |
| KR | 20170045492 | A | * | 4/2017 | ............ F15B 21/047 |
| WO | 2014133400 | A1 | | 9/2014 | |
| WO | WO-2021127288 | A1 | * | 6/2021 | ............... B66D 1/08 |

OTHER PUBLICATIONS

International Search Report issued in PCT/IB2022/055635.

Action issued in Corresponding European Application No. 22735614.4 on Dec. 18, 2024.

* cited by examiner

TOWING WINCH AND FOREST MACHINE PROVIDED WITH SAID WINCH

CROSS-REFERENCE TO RELATED APPLICATIONS

This Patent Application is a U.S. national stage application under 35 U.S.C. § 371 of PCT Application No. PCT/IB2022/055635, filed on Jun. 17, 2022, which claims priority from Italian Patent Application No. 102021000016052 filed on Jun. 18, 2021. The entire disclosures of the aforementioned priority applications are incorporated herein by reference in their entireties.

TECHNICAL FIELD OF THE INVENTION

The present invention relates to a towing winch and to a forest machine provided with said winch.

STATE OF THE ART

For the felling of trees, the separation of the branches from the log, the cutting, the loading and the transportation of said logs, the use of dedicated forest machines comprising a wheeled or tracked tractor pushed by a thermal engine is currently increasingly widespread.

The tractor moves a carriage which is also wheeled or tracked, and which, depending on the application, carries a felling assembly in the case of felling machines, a jawed gripper in the case of loading/unloading machines, or is part of a trailer with sides for loading the timber, in the case of transportation machines.

In some solutions, the trailer is also associated with a dedicated arm for loading and unloading the logs.

In most of the applications, the tractor and the trailer are connected to one another by means of a steering joint controlled hydraulically.

When the machine is required to operate not only on rough zones, but also to go up and down both empty and fully loaded along steeply sloped lands or tracks, the machine is also provided with a winch driven hydraulically, whose cable when anchored to the ground, drags the machine during the upward steps and holds the machine during the downward steps.

Such hydraulic winches, if duly controlled by an operator, thus confer to the machine the ability to overcome steep differences in height and to reach zones otherwise not reachable and for this reason they confer to the machine a strong added value.

The presence of the winch imposes the modification of some parts of the traditional forest machines devoid of winch, among which the hydraulic circuit, to which new pipes are added or the existing ones are modified so as to provide hydraulic attachments suitable for the provided type of winch and shaped depending on the position of the winch on the machine.

Furthermore, in addition to this, still depending on the position of the winch, cable guiding devices are often added for guiding the towing wire towards the provided exit end from the machine which is at the front in some cases and at the rear in other cases.

For these reasons, two types of machines are currently manufactured and, in particular, forest machines devoid of winch and forest machines provided with winch, where the winch is integral part of the machine, remains on the machine for the entire operating life thereof without the possibility of removal and/or reuse on forest machines.

The operators of the sector are thus obliged to have a large fleet of machines, where the machines provided with winch have weights and, especially, costs definitely higher than those of the corresponding traditional machines devoid of winch.

In all of the cases, the winch absorbs a consistent part of the hydraulic energy generated by means of the thermal engine which is no longer available or is less available, the other hydraulic members provided on board the machine or at the forward movement of the machine when this provides for hydraulic engines.

Therefore, in general, forest machines provided with hydraulic winch are not completely satisfactory.

For this reason, some solutions provide for the use of machines devoid of winch and the upward towing and the downward holding of said machines, when necessary, is devolved to an auxiliary towing machine, which comprises a carriage with wheels or tracks driven by a thermal engine of their own and a hydraulic winch carried by the carriage and driven by a hydraulic circuit, whose pump is driven by the thermal engine under the constant control of an operator.

Even if used, such auxiliary towing machines have the same problems of the machines provided with hydraulic winch on board with regard to the consumption of hydraulic energy or the use of part of the energy made available by their thermal engine.

In all of the cases, it has been possible to experimentally verify that it is difficult to synchronize the pull exerted by the winch with the forward movement of the machine since the latter is pushed by a propulsor of its own, hence an operator in charge and, normally the driver of the machine, has to pay extreme and continuous attention to the machine-winch assembly so as to prevent or contain as much as possible jerking, dragging of the wheels and skidding of the machine on the ground by effect of the uneven path followed and/or anomalous loads or tension peaks on the towing cable.

SUBJECT AND SUMMARY OF THE INVENTION

The object of the present invention is to manufacture a winch, whose manufacturing characteristics allow solving the above-described problems in a simple and cost-effective manner.

According to the present invention, a winch is manufactured, as claimed in claim 1.

The present invention further relates to a forest machine.

A further object of the present invention is to manufacture a forest machine, whose manufacturing characteristics allow solving the above-described problems in a simple and cost-effective manner.

A particular object of the present invention is to manufacture a forest machine provided with a winch, which operates in an efficient and reliable manner and allows the driver of the machine to devote himself/herself solely to driving the machine also in the presence of an active winch.

A further object of the present invention is to manufacture a forest machine, whose winch can be demounted in a simple manner and, especially, in a short timeframe and with a limited effort and also by the personnel in charge of the machine without the intervention of specialized labor.

According to the present invention, a forest machine is manufactured, as claimed in claim 4 or in claim 5.

BRIEF DESCRIPTION OF THE DRAWINGS

The invention will now be described with reference to the accompanying drawings, which illustrate a non-limiting example embodiment thereof, wherein.

DETAILED DESCRIPTION OF PREFERRED EMBODIMENTS OF THE INVENTION

Figure 1:
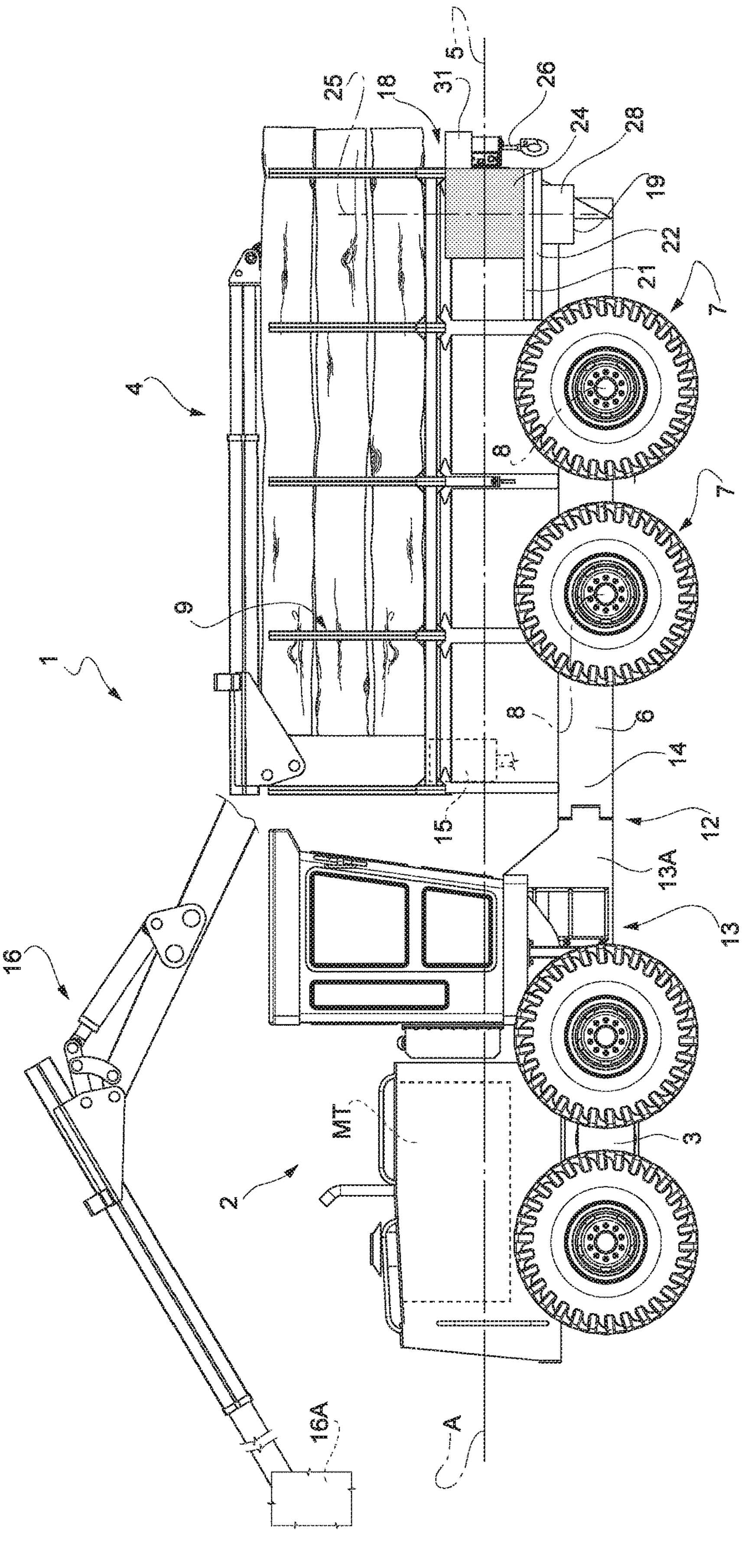
FIG. 1 illustrates, in a side elevation view, schematically and substantially in blocks, a first preferred embodiment of a forest machine manufactured according to the principles of the present invention.

In the accompanying figures, reference numeral 1 indicates, as a whole, a forest machine and, in particular, a loading and transportation forest machine, to which the following disclosure will explicitly refer without thereby losing generality.

The machine 1 comprises a tractor 2, which is known per se, has its own longitudinal axis A and comprises a wheeled carriage 3 and a thermal engine MT for driving the wheeled carriage 3.

The machine 1 also comprises a transportation carriage 4, which has its own longitudinal axis 5 and comprises its own attachment frame, indicated by 6, a pair of wheeled axles 7 coupled to the frame 6 in a manner known per se and having respective axes 8 orthogonal to the longitudinal axis 5 and a structure 9, which is also known per se and which delimits a loading compartment 10 of the timber.

According to a variation not illustrated, in the tractor 2 or in the carriage 4 or in both, the wheels are replaced by tracks.

In any case, the carriage 4 is connected to the tractor 2 by means of a hydraulic steering joint 12, which is also known per se and which connects a rear end portion 13A of a frame 13 of the tractor 2 to a front portion 14 of the frame 6 of the carriage 4.

In the illustrated example, the machine 1 still comprises an articulated arm 16, which is also known per se, and which is carried by the frame 6 in a position adjacent to the hydraulic steering joint 12 and carries a jaw gripping head 16A, known per se, for loading the timber inside the compartment 10 of the carriage 4. The articulated arm 16 is driven by a hydraulic circuit, known per se, having a hydraulic pump 15 driven directly or indirectly by the thermal engine MT. To the hydraulic circuit also the hydraulic engines are connected for driving the wheels or the tracks when the driving provided for the latter is of hydraulic type.

Figure 2:
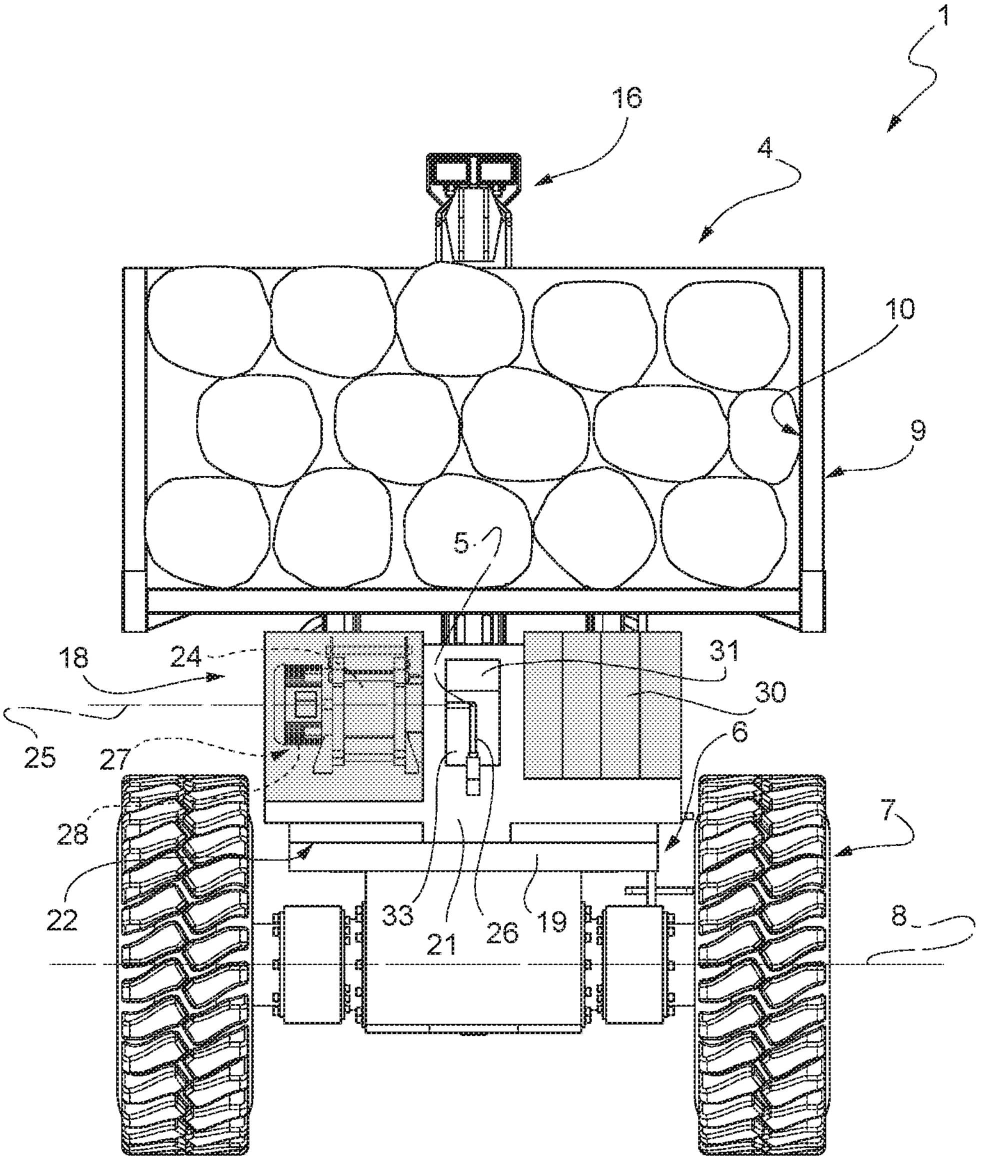
FIGS. 2 and 3 are a rear view and, respectively, a top view of the forest machine of FIG. 1.
Figure 3:
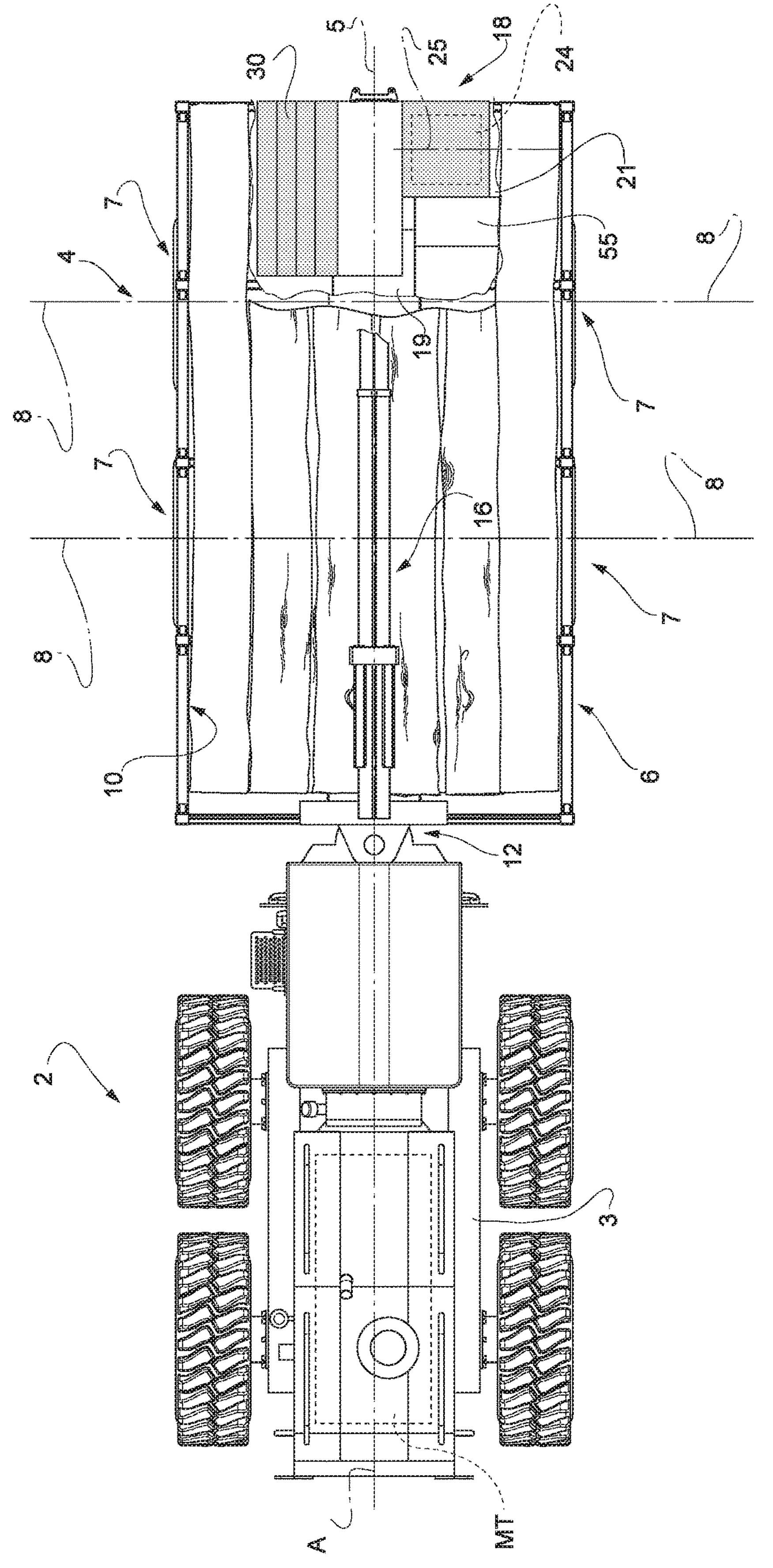

Still with reference to FIGS. 1 to 3, the machine 1 further comprises an electric towing/holding winch 18 usable for towing the entire machine 1 with or without the respective load during an upward travel of the machine 1 on rough or steeply sloped lands or paths and for holding the machine 1 with or without the respective load during a downward travel of the machine 1 along the aforementioned rough or steeply sloped lands or paths. In the first case, the winch integrates the torque of upward forward movement of the machine, whereas in the second case it integrates the engine brake action exerted by the machine moving downward, in substance a holding action, as it will be better described in the following.

With specific reference to FIG. 1 or 2, the winch 18 is carried by a rear end portion 19 of the frame 6 and thus longitudinally opposite to the portion 14 and comprises its own attachment frame 21, which is coupled to the portion 19 in a removable manner by means of a releasable connection device 22, for example of the type comprising attachment or anchoring elements and screws or other equivalent releasable connection modes (FIGS. 1 and 2).

Preferably, the frames 6 and 21 are configured in such a manner that the winch 18 is inserted and extracted in longitudinal direction acting on the rear side of the carriage 4, i.e. on the free end of the carriage 4.

With reference to the accompanying figures, connected to the frame 21, the winch 18 comprises a towing or power drum 24 (schematically illustrated) coupled to the frame 21 in a rotatable manner around a horizontal axis 25, a cable 26 wound around the drum 24.

According to a variation not illustrated, on the towing drum 24 the cable 26 is only partially wound, generally a few turns, and the cable 26 is also wound on an additional winding drum which does not exert towing actions of the cable but has a mere winding or “storehouse” function of the part of the cable that is waiting to be unwound.

In such case also the winding drum could be motorized by an electric motor, since the mere winding of the cable requires minimum power. The towing drum 24 thus behaves like a wheel or a towing rotating member.

In the same way, downstream of the towing drum in the unwinding or exit direction of the cable 26, a manual unwinding device of the cable could be provided, which is also driven by a motor that could be of electric type as well given the minimum power required.

Irrespective of the fact that the drum 24 has the double function of towing and winding the cable, or a mere towing function leaving the winding to another drum, the towing drum 24 is rotated by an electric motor 28.

Still connected to the frame 21, the winch 18 further comprises an accumulator pack 30 for driving the electric motor 28 and a command device 31 of the electric motor 24 for unwinding/rewinding the cable 26.

Conveniently, as is visible in FIGS. 2 and 3, the towing drum 24 and the accumulator pack 30 are arranged adjacent to one another and on opposite lateral sides of the longitudinal axis 5 so that the cable 26 protrudes on the outside and transits through an exit opening 33 arranged between the drum 24 and the accumulator pack 30 (FIG. 2).

The presence of the frame 21 and the possibility to decouple it from the frame 6 allows extracting and inserting the entire winch 18 in a simple and quick manner and without the need to demount other parts or components of the machine 1 and without the intervention of specialized labor.

According to a variation, the winch 18 is devoid of the attachment frame 21 common to the drum 24 and to the accumulator pack 30, and the drum 24 and the accumulator pack 30 are components which are distinct and separate from one another and each provided with a respective attachment frame to the frame 6 and demountable from the frame 6.

Such manufacturing solution allows adapting the winch 18 for example to the different configurations or geometries of the frame 6 and/or of the structure 9. In particular, such solution allows varying the position of the accumulator pack 30 leaving substantially unvaried the position of the towing drum 24.

Figure 4:
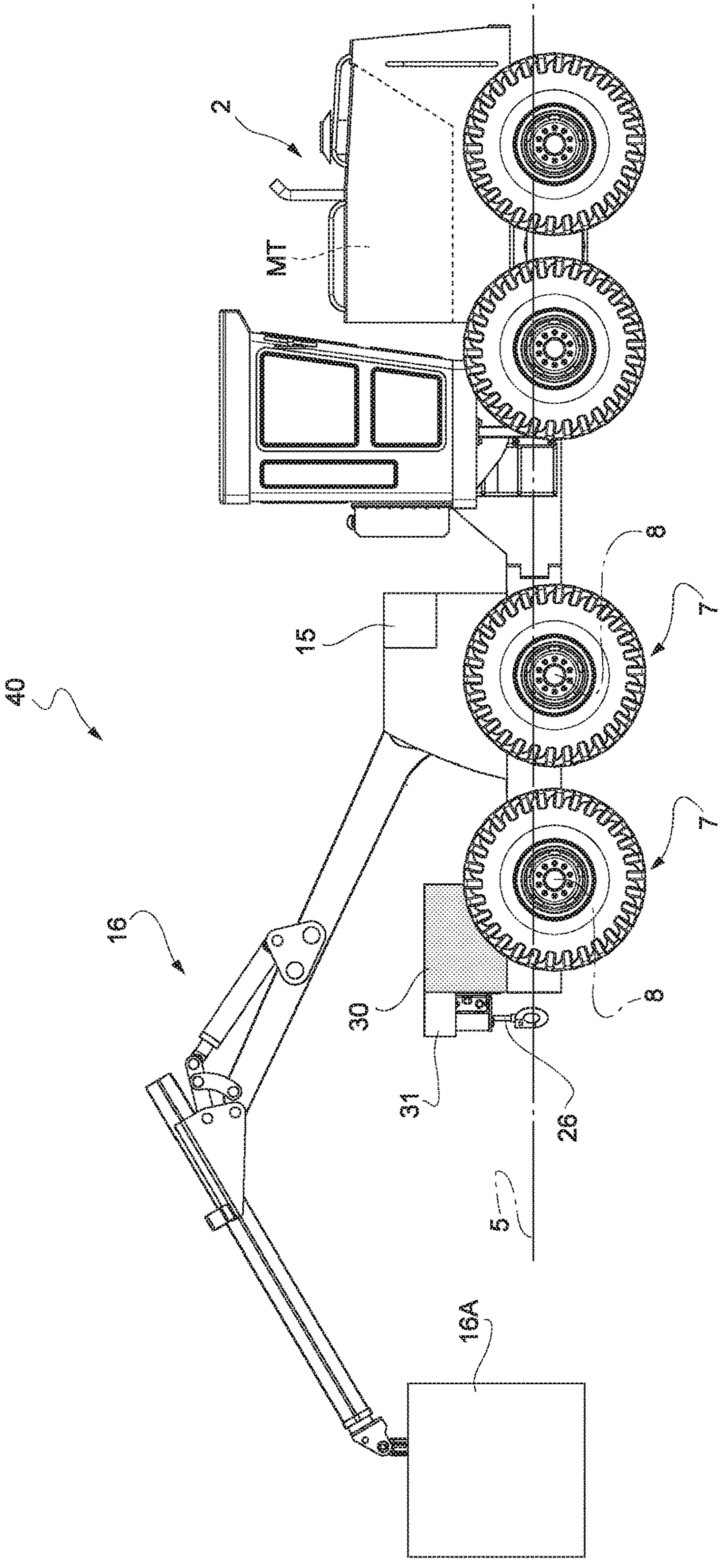
FIGS. 4 and 5 illustrate, schematically, in a side elevation view and, respectively in blocks a second preferred embodiment of a forest machine according to the present invention.
Figure 5:
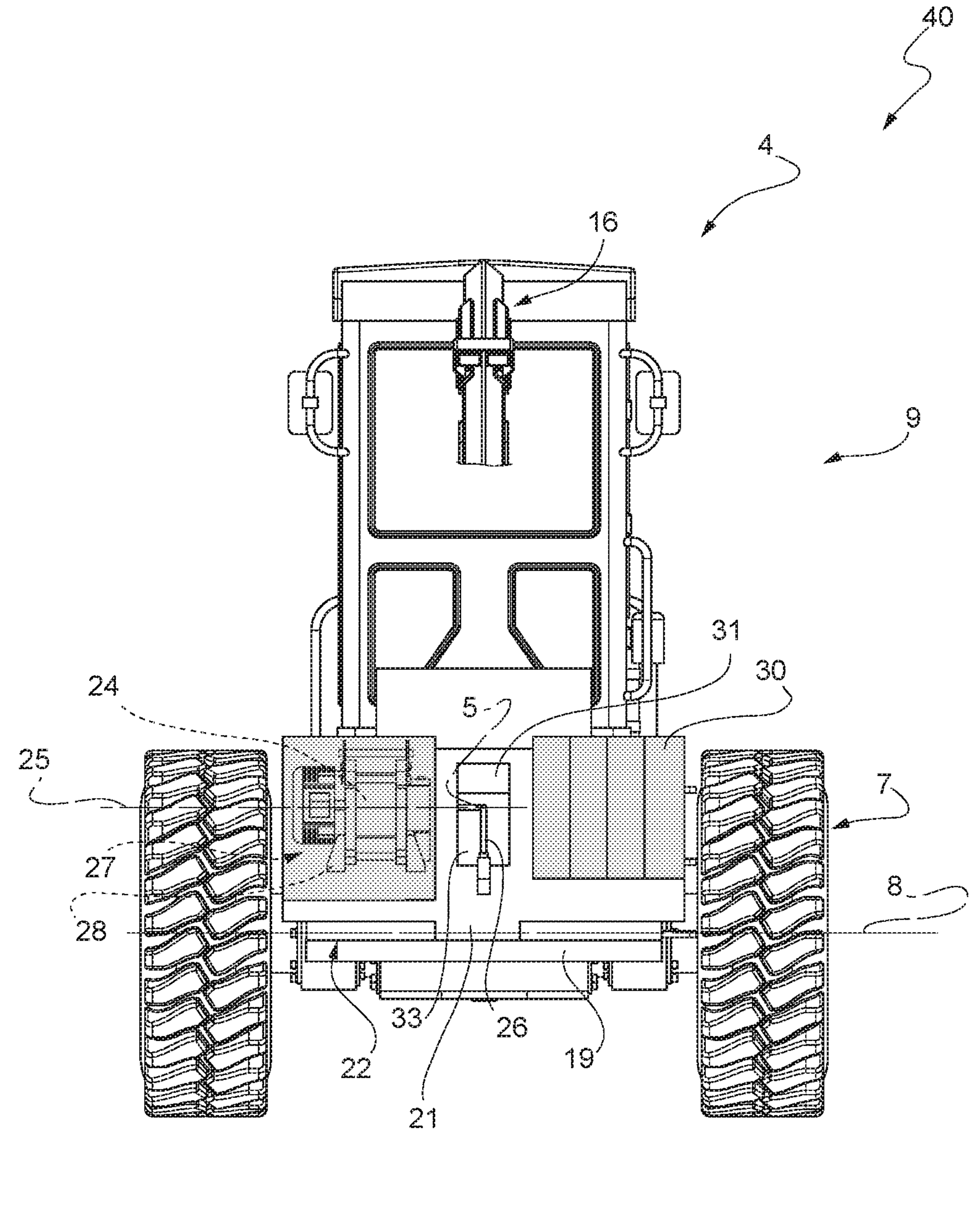

The embodiment illustrated in FIGS. 4 and 5 relates to a forest machine 40 similar to the machine 1 and whose constituent parts are indicated, when possible, by the same references of the corresponding parts of the machine 1.

The machine 40 is a felling or handling and loading machine depending on the operating head 16A mounted at the end of the articulated arm 16 and comprises a carriage, which differs substantially from the carriage 4 in that it is devoid of the structure 9 and of the loading compartment 10 of the timber.

Like in machine 1, also in machine 40 an electric winch is mounted, which is arranged on a free front end portion 45 of the carriage and is structurally and functionally the same as the winch 18.

Like the winch 18, also in the electric winch, the towing drum 24 and the accumulator pack 30 are arranged on opposite sides of the longitudinal axis 5 and, still like the winch 18, the towing drum 24 and the accumulator pack 30 are carried by a common removable frame 21 or by single frames which are separate from one another and demountable.

Figure 6:
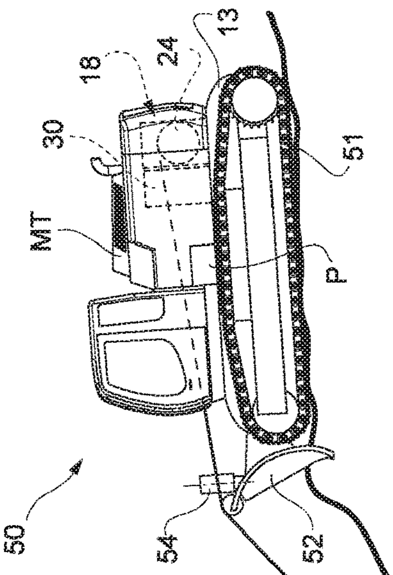
FIG. 6 illustrates, schematically, in a side elevation view and substantially in blocks a third preferred embodiment of a forest machine according to the present invention.
Figure 6:
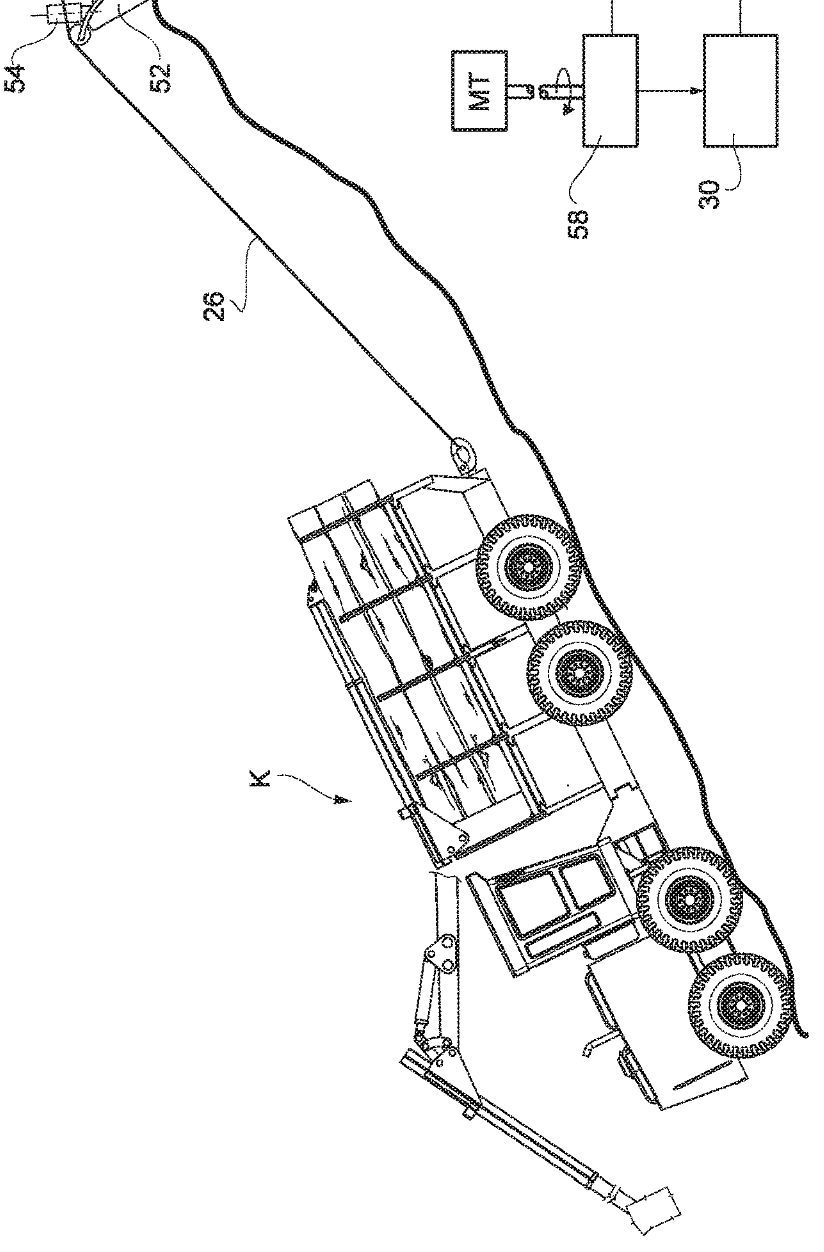

The embodiment illustrated in FIG. 6 relates to a towing forest machine 50, which differs from the machines 1, 40 in that it is devoid of the transportation or operating carriage of the machines 1, 40.

The machine 50 is an "aid" machine of a traditional motorized forest machine. In other words, it is a machine configured to integrate the upward forward movement action of the traditional machine for increasing the resistance action to the forward movement by gravity of the motorized machine when the latter goes along downward sections. Obviously, the machine can also drag or hold a load different from the machine.

In any case, the machine 50 is similar to the tractor 2, from which it differs in that it has tracks 51 in replacement of the wheeled axles driven by the thermal engine MT and it carries on board the winch 18, which is coupled directly or in a releasable manner to the frame 13, as described for the forest machines 4 and 40.

In particular, the winch 18 is connected to an end portion of the frame 13, whose opposite end portion carries coupled a strut blade 52, known per se and movable under the thrust of a hydraulic actuator.

Like the arm 16, the hydraulic actuator is connected to a hydraulic circuit, known per se, having a hydraulic pump P driven directly or indirectly by the thermal engine MT.

The blade 52 is movable to and from a strut position, in which it is partially inserted in the ground and cooperates with the tracks 51 for maintaining the machine 50 in a towing or holding position of a motorized self-propelled operating machine, generically indicated by K. In the specific case, the self-propelled machine K is of the type illustrated in FIGS. 1 to 5 but devoid of towing winches.

In the illustrated example, the cable 26 extends longitudinally through the machine 50 and protrudes frontally between two guiding rollers 54.

Figure 7:
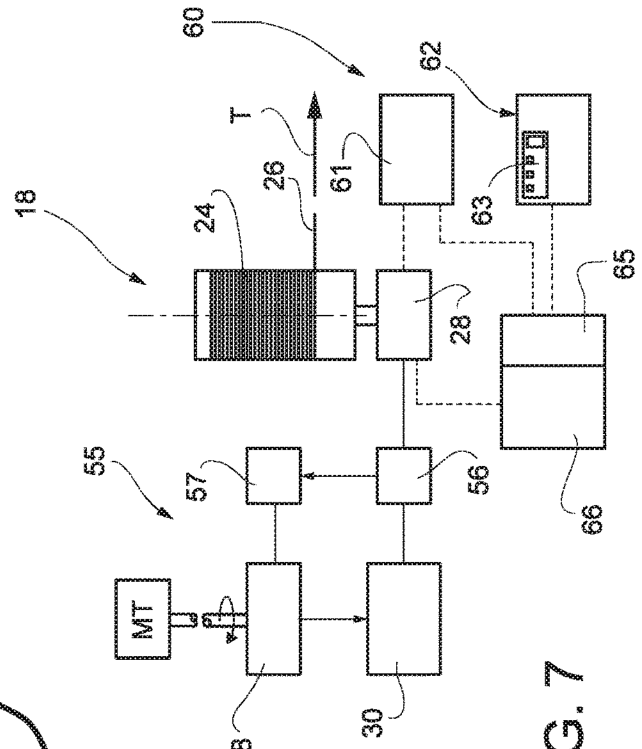
FIG. 7 illustrates, schematically and substantially in blocks, a towing winch and an electric command and control circuit thereof manufactured according to the principles of the present invention.

Irrespective of how the forest machines 4, 40 and 50 are manufactured, i.e. irrespective of their function or use, the electric motors 28 of the respective winches 18 are commanded and controlled by respective electric drive and control circuits indicated by 55 and schematized in FIG. 7.

Each electric drive and control circuit 55 comprises a respective accumulator pack 30 which is mainly dedicated to powering the respective electric motor 28, a respective detection block 56 for detecting the electric energy absorbed by the electric motor 28 in each forward and return strokes of the cable 26, i.e. in a towing step, in which the cable 26 tows the self-propelled machine K, and the electric energy returned in each holding step, in which the cable 26 holds the self-propelled machine K opposing an action exerted on the cable 26 of the self-propelled machine K during the downstream descent thereof.

Each electric circuit 55 further comprises its own comparator block 57 configured to calculate, in each forward and return stroke of the cable, the difference between the electric energy absorbed during the pulling and the electric energy returned during the holding.

Each electric circuit 55 also comprises a respective electric energy generator 58 driven, directly or indirectly, by the thermal engine MT and operating in response to a signal sent by the comparator block 57 for sending the calculated electric energy difference to the accumulator pack 30 and restore the full charge condition of the accumulator pack 30. In other words, the generator 58 intervenes only when the electric energy recovered during the descent step of the load is not sufficient for restoring the electric energy spent during the previous towing step.

Alternatively, the generator 58 is activated independently of the electric energy absorbed in the single forward and return strokes but when the calculated electric energy difference exceeds a pre-established threshold value.

In any case, the electric energy generator 58 is a low power generator since, as it has been possible to verify experimentally, in average the recovered electric power is approximately 70%-80% of the spent electric power.

For this reason, during the sending of the integration energy to the accumulator pack 30, the generator gives the thermal engine MT a reduced quantity of the power made available by said thermal engine MT. It follows that, also during the use of the winch 18, the power supplied by the thermal engine MT practically remains all at disposal of the hydraulic actuation members provided on the machine, unlike the case where the electric motor 28 is completely powered by an electric power generator dedicated thereto still driven by the thermal engine MT.

Still with reference to FIG. 7, during the towing and holding steps the pulling or tensioning T of the cable 26, i.e. the action exerted by the winch 18, is constantly monitored and varied by a towing control assembly 60, which operates autonomously and without any need of intervention by an operator as well as by the driver of the machine served by the winch 18.

The towing control assembly 60 comprises a detection block 61, for detecting in a continuous manner or at predefined intervals of time, the actual tension value T of the cable, for example by controlling the torque exerted by the motor 28 or the current absorbed by the motor 28 and a block 62 for setting a desired pull of the cable 26. On a keyboard 63 of such block 62 the driver of the machine served by the winch 18 acts manually for inserting the desired towing value, or for selecting a desired work condition to which the block 62 associates a desired pull of the cable or a desired range within which the desired pull of the cable can vary.

In any case, the control assembly 60 also comprises a comparator block 65, which is configured to determine the difference between the pull value set by means of the block 62 and the actual pull value acting on the cable 26 detected by the block 61 and a command and control block 66 of the electric motor 28 and configured to vary the torque exerted by the drum 24 and thus the actual pull of the cable depending on the pull difference determined by the block 65 and bringing the instantaneous pull value of the cable 26 back to the desired value set in the block 62.

Experimentally, it has been possible to note that by means of the assembly 60 it is possible to control in a continuous manner or at predefined intervals of time the deflection of the cable 26, i.e. maintain practically constant the tension of the cable 26 at a desired value and corresponding to the towing condition set by means of the block 62.

Understandably, this prevents jerking, the sliding of the wheels of the machine or the arising of anomalous loads on the cable 26 which, inevitably, are transmitted to the forest machine and that, in some cases, drastically reduce the operating life of the cable 26 and/or of the electric motor 28.

Based on the foregoing, it is also evident that the use of an electrically driven winch allows manufacturing forest machines provided with winch, which, with respect to the current forest machines with hydraulic winch, first of all have a simplification of the hydraulic circuit on board the machine since it is devoid of all the power and control part of the hydraulic winch.

The reduction of the hydraulic component also allows increasing the reliability of the known forest machines since there is a reduction in the danger of accidental breakage of the fluid pipes under pressure and hydraulic components, in general, which lead to the blocking of the entire machine.

In addition to this, the use of an electrically driven winch and the provided recovery of the energy differently dissipated in the holding step of the descending self-propelled machine allows manufacturing forest machines manufactured starting from the frame and with the same thermal engine of the current machines devoid of winch without making substantial modifications or making minimum and negligible adaptation modifications thereto.

In addition to this, the use of an electric winch easily installable on the machine and just as easily demountable therefrom in case of need or for maintenance allows manufacturing forest machines that are modular and configurable depending on needs and optimizing and in many cases reducing the fleet of machines, consequently reducing both purchase and maintenance costs.

Based on the foregoing, it is evident that modifications and variations can be made to the described machines 4, 40 and 50 without thereby departing from the scope of protection defined by the claims.

In particular, the forest machines 4, 40 and 50 can have frames and structures and/or configurations different from those described by way of example, just as they can have on board actuating or manipulating members in association with or different from those indicated, for example for adapting them to specific forest activities.

With regard to the machine 50 it is evident that, although it is preferably applied to the forest field, it can, in general, be applied to the towing and holding of any self-propelled operating machines when there is the need to tow them along upward paths and hold them along downward paths and to drag loads dragging on the ground, such as trees or bundles of timber, etc. which as is known can get stuck or slide by gravity.

Along the downward paths, the maximum quantity of recovered energy is obtained when the machine moves with a load on board. In the case where the holding takes place in the absence of a load, the control circuit could comprise a control block of the engine brake of the machine so as to increase the electric energy returned and sent to the accumulator pack 30.

Finally, it is evident that the described low power electric motors, exactly due to the fact of requiring a negligible electric power with respect to that required by the electric motor 28 for driving the towing drum could be connected to the electric circuit for driving said electric motor 28.

Based on the foregoing, it is finally evident that the choice of the size or power of the electric motor of the winch and of the accumulator pack depends on the type of forest machine on which the winch is mounted, on the provided functions or on the provided use of the forest machine in addition to the power of the thermal engine thereof.

The invention claimed is:

1. A self-propelled forest machine comprising:
- a wheeled or tracked carriage;
- a thermal engine for moving the carriage;
- a hydraulic circuit having a hydraulic pump driven by said thermal engine;
- a hydraulic operating member connected hydraulically to said hydraulic circuit; and
- a towing/holding winch configured for assisting in towing and holding a further motorized forest machine, said towing/holding winch being carried by said carriage, and comprising:
  - a towing cable;
  - a towing rotating member configured to at least partially wind said towing cable to tow the further motorized forest machine;
  - an electric motor for rotating said towing rotating member; and
  - an electric drive and control circuit for driving and controlling at least said electric motor, said electric drive and control circuit comprising:
    - an accumulator pack for powering said electric motor;
    - a detection block for detecting actual electric energy absorbed by the electric motor in one or more towing steps of the further motorized forest machine hooked to said towing cable, and actual electric energy recovered by the electric motor in one or more holding steps, wherein the towing cable exerts an action opposite to that exerted by the further motorized forest machine;
    - an energy comparator block for calculating a difference between the actual absorbed electric energy and the actual recovered electric energy; and
    - an electric energy generator driven directly or indirectly by said thermal engine and configured to supply electric energy corresponding to the calculated difference to said accumulator pack; and
- a towing control assembly comprising:
  - a tension detection block configured to detect, in a continuous manner or at predefined intervals of time, an actual tension value of the towing cable;
  - an insertion block for setting a desired tension value of the towing cable;
  - a tension comparator block configured to determine the difference between the set tension value and the actual tension value acting on the towing cable; and
  - a command and control block of the electric motor configured to vary the torque exerted by the towing rotating member depending on said tension difference of the towing cable and bring the actual tension value of the towing cable back to the desired tension value set in the insertion block.

2. The self-propelled forest machine according to claim 1, wherein said insertion block comprises a keyboard for manually inputting said desired tension value of the towing cable by an operator.

3. The self-propelled forest machine according to claim 1, wherein said towing/holding winch comprises a supporting frame carrying said towing rotating member, said electric motor and said electric drive and control circuit; said supporting frame being configured to couple to a carrying frame of said carriage in a demountable manner.

4. The self-propelled forest machine according to claim 1, wherein said carriage has a longitudinal axis and said towing rotating member and said accumulator pack are arranged on opposite lateral sides of said longitudinal axis.

5. The self-propelled forest machine according to claim 1, wherein said towing rotating member is arranged along a first longitudinal lateral face of said carriage and said accumulator pack is arranged along a second longitudinal lateral face of said carriage opposite to the first lateral face.

6. The self-propelled forest machine according to claim 1, wherein an exit section of said towing cable extends between said towing rotating member and said accumulator pack.

7. The self-propelled forest machine according to claim 1, further comprising a tractor carrying said thermal engine and a hydraulic steering joint interposed between said carriage and said tractor; said towing rotating member being carried by a free end portion of said carriage opposite to an end portion connected to said hydraulic steering joint.

8. The self-propelled forest machine according to claim 1, wherein said towing/holding winch comprises its own supporting frame distinct from a carrying frame of said carriage and said towing rotating member, said electric motor, and said electric drive and control circuit are carried by said supporting frame; releasable attachments are interposed between the carrying frame of the carriage and said supporting frame so as to allow the removal of said towing/holding winch from said carrying frame.

9. The self-propelled forest machine according to claim 1, wherein said carriage comprises a structure delimiting a loading compartment for logs to be transported, and said towing/holding winch is arranged at least partially below said loading compartment.

10. The self-propelled forest machine according to claim 9, wherein said accumulator pack is arranged below said loading compartment.

11. The self-propelled forest machine according to claim 9, wherein said carriage comprises at least one axle and said towing rotating member is arranged between said axle and said loading compartment.

12. A method for assisting in towing and holding a further motorized forest machine using a towing/holding winch carried by a wheeled or tracked carriage of a self-propelled forest machine, the towing/holding winch comprising an electric motor, a towing cable, an accumulator pack, and an electric energy generator driven directly or indirectly by a thermal engine of the self-propelled forest machine, the method comprising:

(a) powering the electric motor from the accumulator pack during one or more towing steps of the further motorized forest machine hooked to the towing cable, thereby causing the electric motor to absorb electric energy;

(b) recovering electric energy from the electric motor to the accumulator pack during one or more holding steps of the further motorized forest machine, wherein during the holding steps the towing cable exerts an action opposite to that exerted by the further motorized forest machine;

(c) detecting the actual electric energy absorbed by the electric motor during said one or more towing steps and the actual electric energy recovered during said one or more holding steps;

(d) calculating a difference between the detected absorbed electric energy and the detected recovered electric energy;

(e) driving the electric energy generator with the thermal engine to supply electric energy corresponding to the calculated difference to the accumulator pack; and (f) controlling, in a continuous manner or at predefined intervals of time, a tension on the towing cable by:

(i) detecting an actual tension value of the towing cable;

(ii) determining a difference between the actual tension value and a desired tension value; and (iii) varying a torque of the electric motor based on the determined difference to bring the actual tension value toward the desired tension value.

* * * * *